United States Patent
Bux et al.

(10) Patent No.: US 9,256,527 B2
(45) Date of Patent: Feb. 9, 2016

(54) LOGICAL TO PHYSICAL ADDRESS MAPPING IN STORAGE SYSTEMS COMPRISING SOLID STATE MEMORY DEVICES

(75) Inventors: Werner Bux, Rueschlikon (CH); Robert Haas, Rueschlikon (CH); Xiao-Yu Hu, Rueschlikon (CH); Roman Pletka, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/812,377

(22) PCT Filed: Jul. 25, 2011

(86) PCT No.: PCT/IB2011/053299
§ 371 (c)(1),
(2), (4) Date: Jan. 25, 2013

(87) PCT Pub. No.: WO2012/014140
PCT Pub. Date: Feb. 2, 2012

(65) Prior Publication Data
US 2013/0124794 A1    May 16, 2013

(30) Foreign Application Priority Data
Jul. 27, 2010   (EP) .................................. 10170863

(51) Int. Cl.
*G06F 12/02* (2006.01)
*G06F 12/08* (2006.01)

(52) U.S. Cl.
CPC ........ *G06F 12/0246* (2013.01); *G06F 12/0866* (2013.01); *G06F 12/0848* (2013.01);
(Continued)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS 7,509,461 B1 * 3/2009 Bhayana et al. ............... 711/144
7,516,267 B2   4/2009 Coulson et al.
(Continued)

FOREIGN PATENT DOCUMENTS

CN           101300554 A     11/2008

OTHER PUBLICATIONS

International Search Report and Written Opinion; International Application No. PCT/IB2011/053299; International Filing Date: Jul. 25, 2011; Date of Mailing: Jan. 24, 2012; pp. 1-8.
(Continued)

*Primary Examiner* — Jared Rutz
*Assistant Examiner* — Jean Edouard
(74) *Attorney, Agent, or Firm* — Cantor Colburn LLP

(57) ABSTRACT

The present idea provides a high read and write performance from/to a solid state memory device. The main memory of the controller is not blocked by a complete address mapping table covering the entire memory device. Instead such table is stored in the memory device itself, and only selected portions of address mapping information are buffered in the main memory in a read cache and a write cache. A separation of the read cache from the write cache enables an address mapping entry being evictable from the read cache without the need to update the related flash memory page storing such entry in the flash memory device. By this design, the read cache may advantageously be stored on a DRAM even without power down protection, while the write cache may preferably be implemented in nonvolatile or other fail-safe memory. This leads to a reduction of the overall provisioning of nonvolatile or fail-safe memory and to an improved scalability and performance.

19 Claims, 7 Drawing Sheets

(52) U.S. Cl.
CPC ..... *G06F2212/214* (2013.01); *G06F 2212/221* (2013.01); *G06F 2212/222* (2013.01); *G06F 2212/466* (2013.01); *G06F 2212/7201* (2013.01)

(56) References Cited

U.S. PATENT DOCUMENTS

| | | | |
|---|---|---|---|
| 2004/0186946 A1* | 9/2004 | Lee | 711/103 |
| 2004/0221125 A1* | 11/2004 | Ananthanarayanan et al. | 711/203 |
| 2008/0215800 A1* | 9/2008 | Lee et al. | 711/103 |
| 2009/0037652 A1* | 2/2009 | Yu et al. | 711/103 |
| 2009/0193184 A1* | 7/2009 | Yu et al. | 711/103 |
| 2010/0030999 A1* | 2/2010 | Hinz | 711/206 |
| 2010/0057984 A1 | 3/2010 | Chen et al. | |
| 2010/0082903 A1* | 4/2010 | Kurashige | 711/118 |
| 2010/0088467 A1* | 4/2010 | Lee et al. | 711/104 |
| 2010/0100667 A1* | 4/2010 | Kang et al. | 711/103 |
| 2010/0169549 A1* | 7/2010 | Yano et al. | 711/103 |
| 2010/0287327 A1* | 11/2010 | Li et al. | 711/3 |
| 2010/0325358 A1* | 12/2010 | Meyer et al. | 711/122 |
| 2010/0332754 A1* | 12/2010 | Lai et al. | 711/118 |
| 2011/0055458 A1* | 3/2011 | Kuehne | 711/103 |
| 2011/0072196 A1* | 3/2011 | Forhan et al. | 711/103 |
| 2011/0082967 A1* | 4/2011 | Deshkar et al. | 711/103 |
| 2011/0082985 A1* | 4/2011 | Haines et al. | 711/154 |
| 2011/0161554 A1* | 6/2011 | Selinger et al. | 711/103 |
| 2011/0283043 A1* | 11/2011 | Schuette | 711/5 |
| 2012/0260025 A1* | 10/2012 | Hida et al. | 711/103 |
| 2013/0067289 A1* | 3/2013 | Maislos et al. | 714/54 |

OTHER PUBLICATIONS

Aayush Gupta, et al.,"DFTL: A Flash Translation Layer Employing Demand-based Selective Caching of Page-level Address Mappings," ASPLOS, ACM, Mar. 2009, pp. 1-12.

* cited by examiner

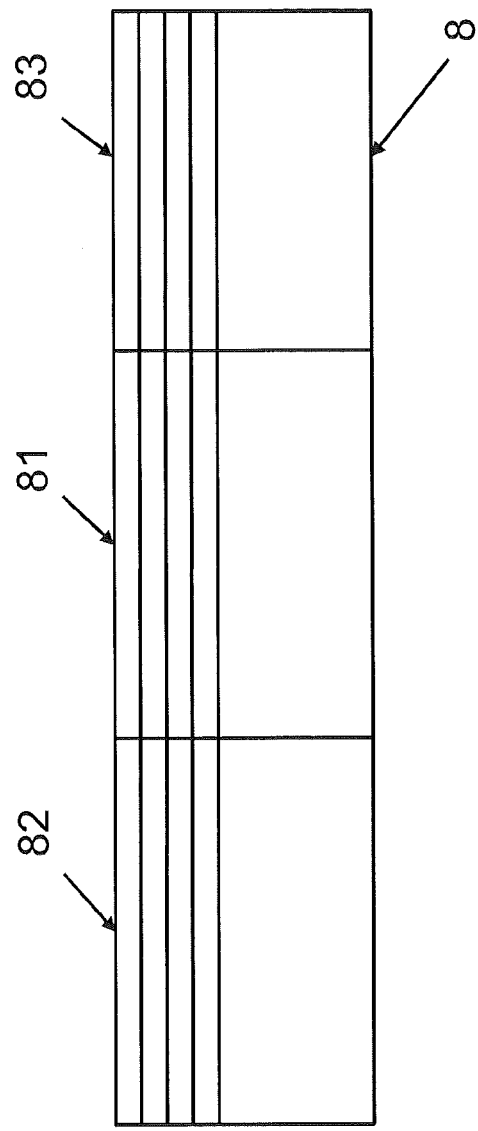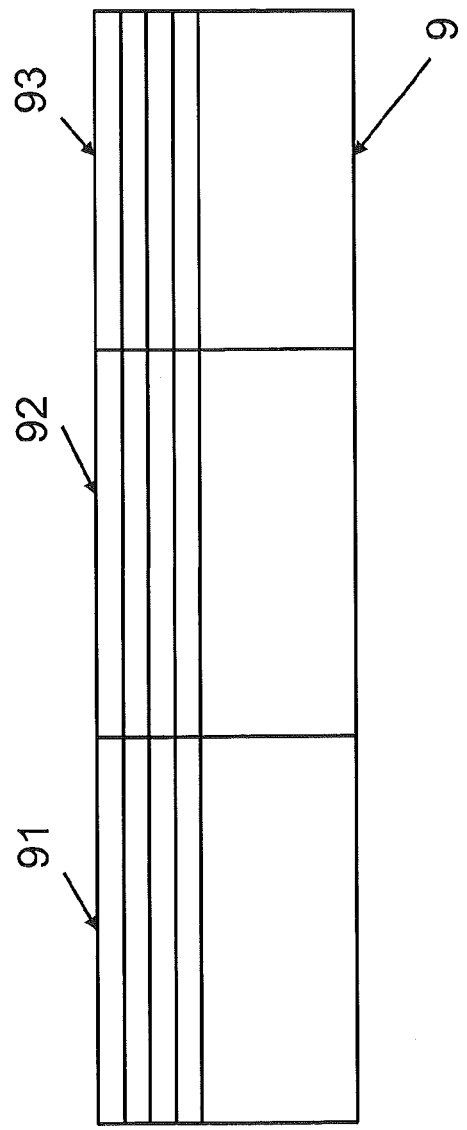
FIG 7a
FIG 7b

LOGICAL TO PHYSICAL ADDRESS MAPPING IN STORAGE SYSTEMS COMPRISING SOLID STATE MEMORY DEVICES

PRIORITY

This is a U.S. national stage of application No.: PCT/IB2011/053299, filed Jul. 25, 2011. Priority under 35 U.S.C. §119(a) and 35 U.S.C. §365(b) is claimed from European Patent Application No. 10170863.4, filed Jul. 27, 2010, and all the benefits accruing therefrom under 35 U.S.C. §119, the contents of which in its entirety are herein incorporated by reference.

FIELD OF THE INVENTION

The present invention generally relates to storage systems comprising solid state memory devices such as flash based memory devices, and to techniques for efficiently providing read and/or write access to data stored on such memory devices, in particular with a focus on logical to physical address mapping.

BACKGROUND

Solid-state memory devices encompass rewritable non-volatile memory devices which use electronic circuitry for storing data. Currently, solid-state memory devices start replacing conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with an appreciated robustness due to lack of moveable parts.

However, writing data to flash memory devices requires paying attention to specifics in the flash technology: NAND Flash memory is organized in units of pages and blocks. Multiple pages form a block. While read and write operations can be applied to pages as a smallest unit of such operation, erase operations can only be applied to entire blocks. And while in other storage technologies outdated data can simply be overwritten by new data, flash technology requires an erase operation before new data can be written to an erased block.

For the reason that in flash technology erase operations take much longer than read or write operations, a writing technique is applied called "write out of place" in which new or updated data is written to some free page offered by a free page allocator instead of writing it to the same page where the outdated data resides. The page containing the outdated data is marked as invalid page. At some point in time, a process called "garbage collection" frees blocks for new writes by moving the content of all valid pages of a block to free pages at different blocks. As a result, the subject block finally comprises invalid pages only and can be erased. While this procedure requires some additional write and read operations in excess, it is apparent that by such approach immediate as well as frequent erase operations are avoided which would contribute to a much higher overall processing than an overhead of some additional write and read operations do.

However, it is also apparent that the write out of place and garbage collection processes require support from a management structure for translating the physical addresses at which the data is stored in the flash memory into logical addresses used by upper layer systems interacting with the present storage system, and vice versa. A means for supporting such translation may be an LBA to PBA mapping table (Logical Block Address to Physical Block Address) or an LPN to PPN mapping table (Logical Page Number to Physical Page Number) subject to a block or page resolution of the mapping. A management structure including such address mapping means and corresponding routines may advantageously be implemented in a controller of the solid state memory device and is called flash translation layer (FTL) for flash applications specifically. The flash translation layer hides any address translation against the host such that the flash translation layer can be understood as a management structure that emulates the flash memory device as an LBA accessible storage device to the host.

A main memory of the storage controller may be a preferred location for depositing the address mapping information for various reasons. This certainly is feasible for small flash memory sizes. However, with an increase in flash memory capacity, the address mapping information also increases to a level where the entire mapping information will cause the main memory size go beyond economic efficiency.

Several techniques are proposed to alleviate this problem. Specifically, in "DFTL: A Flash Translation Layer Employing Demand-based Selective Caching of Page-level Address Mappings" by A. Gupta et al., in ASPLOS'09, Mar. 7-11, 2009, Washington, D.C., USA, accessed and retrieved on the Internet at http://csl.cse.psu.edu/publications/dftl-asplos09.pdf on Jul. 8, 2010, a Demand-based Flash Translation Layer DFTL is proposed in which the entire logical-to-physical address translation set is maintained on some logically fixed portion of flash and is referred to as the Global Mapping Table. However, only a small number of these mappings can be present in SRAM. These active mappings present in SRAM form the Cached Mapping Table (CMT). Since out-of-place updates are performed on flash, translation pages get physically scattered over the entire flash memory. DFTL keeps track of all these translation pages on flash by using a Global Translation Directory (GTD). When servicing a request the following process of address translation is used: If the required mapping information for the given read/write request exists in SRAM (in CMT), it is serviced directly by reading/writing the data page on flash using this mapping information. If the information is not present in SRAM then it needs to be fetched into the CMT from flash prior to reading/writing the data page on flash. However, depending on the state of CMT and the replacement algorithm being used, it may entail evicting entries from SRAM.

BRIEF SUMMARY OF THE INVENTION

According to a first aspect, the invention is embodied as a storage controller for controlling a reading and writing of data from/to a solid state memory device. The storage controller comprises a read cache for buffering address mapping information representing a subset of address mapping information stored in the memory device. Such address mapping information includes a mapping of logical address information for identifying data in a requesting host to physical address information for identifying data in the memory device. The storage controller further comprises a write cache for buffering address mapping information to be written to the memory device.

In embodiments, the storage controller may comprise one or more of the following features:

the write cache is maintained as a unit separate from the read cache in that content buffered in the read cache is searchable independent from content buffered in the write cache and vice versa;

one of a non-volatile memory and a volatile fail-safe memory including the write cache, and a volatile memory including the read cache;

an allocation engine for allocating cache memory space to the read cache and to the write cache subject to one or more of a write workload and a read workload;

an address mapping entry in the write cache including the physical address information, the logical address information associated with the physical address information, and a reference for grouping address mapping entries belonging to a common address mapping region;

the reference corresponds to a pointer for pointing to another address mapping entry in the write cache which other address mapping entry is identified as being stored on a common page of the memory device;

a data structure stored in the write cache including a page identifier, a counter for counting the number of entries in the write cache associated with such page identifier, and an entry pointer pointing to a write cache entry associated with such page identifier.

According to another aspect, the invention is embodied as a storage system, comprising a storage controller according to one of the embodiments of such storage controller, and a solid state memory device for storing data and for storing address mapping information for mapping logical address information for identifying data in the host accessing the storage system to physical address information for identifying data in the memory device.

According to another aspect, the invention is embodied as a method for reading data from a solid state memory device, in which memory device data and mapping information for mapping logical address information for identifying data in a requesting host to physical address information for identifying data in the memory device to logical address information for identifying data in a requesting host are stored. Logical address information associated with the data to be read is received. The logical address information is searched in one of a write cache for buffering address mapping information to be written to the memory device and a read cache for buffering a subset of the address mapping information stored in the memory device. If the logical address information is not found in the cache searched, i.e. either the write cache or the read cache, the logical address information is searched in the other cache, i.e. either the read cache or the write cache respectively. If the logical address information is not found in either of the write cache and the read cache, the physical address information associated with the logical address information is identified and read by means of the mapping information stored in the memory device, and a data read operation is issued for the physical address information identified.

In embodiments, the read method may comprise one or more of the following features:

if the logical address information is found in the write cache the physical address information associated with the logical address information is identified from a corresponding entry in the write cache, and a data read operation is issued for the physical address information identified;

if the logical address information is found in the read cache identifying the physical address information associated with the logical address information is identified from a corresponding entry in the read cache, and a data read operation is issued for the physical address information identified;

the physical address information read is used to update an entry in the read cache According to another aspect, the invention is embodied as a method for writing data to a solid state memory device, in which memory device data and mapping information for mapping logical address information for identifying data in a request to physical address information for identifying data in the memory device are stored. Data and logical address information associated with the data is received. The data is written to a location of the memory device identified by some physical address information. The logical address information is searched in a write cache dedicated for buffering address mapping information to be written to the memory device. If the logical address information is not found in the write cache, an address mapping entry is added to the write cache comprising a mapping of the logical address information to the physical address information the data now is stored at.

In embodiments, the write method may comprise one or more of the following features:

if the logical address information is found in the write cache the corresponding address mapping entry in the write cache is updated with the physical address information newly associated with the data.

the logical address information is searched in a read cache for buffering address mapping information representing a subset of the address mapping information stored in the memory device. If the logical address information is found in the read cache the corresponding address mapping entry in the read cache is updated with the physical address information newly associated with the data;

the logical address information is searched in the read cache at a time the write cache is updated.

According to another aspect, the invention is embodied as a computer program product comprising a computer readable medium having computer readable program code embodied therewith, the computer readable program code comprising computer readable program code configured to perform a read or a write method according to any one of the embodiments of the read or the write method.

It is understood that method steps may be executed in a different order than listed in a method claim. Such different order shall also be included in the scope of such claim as is the order of steps as presently listed.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE EMBODIMENTS

Figure 1:
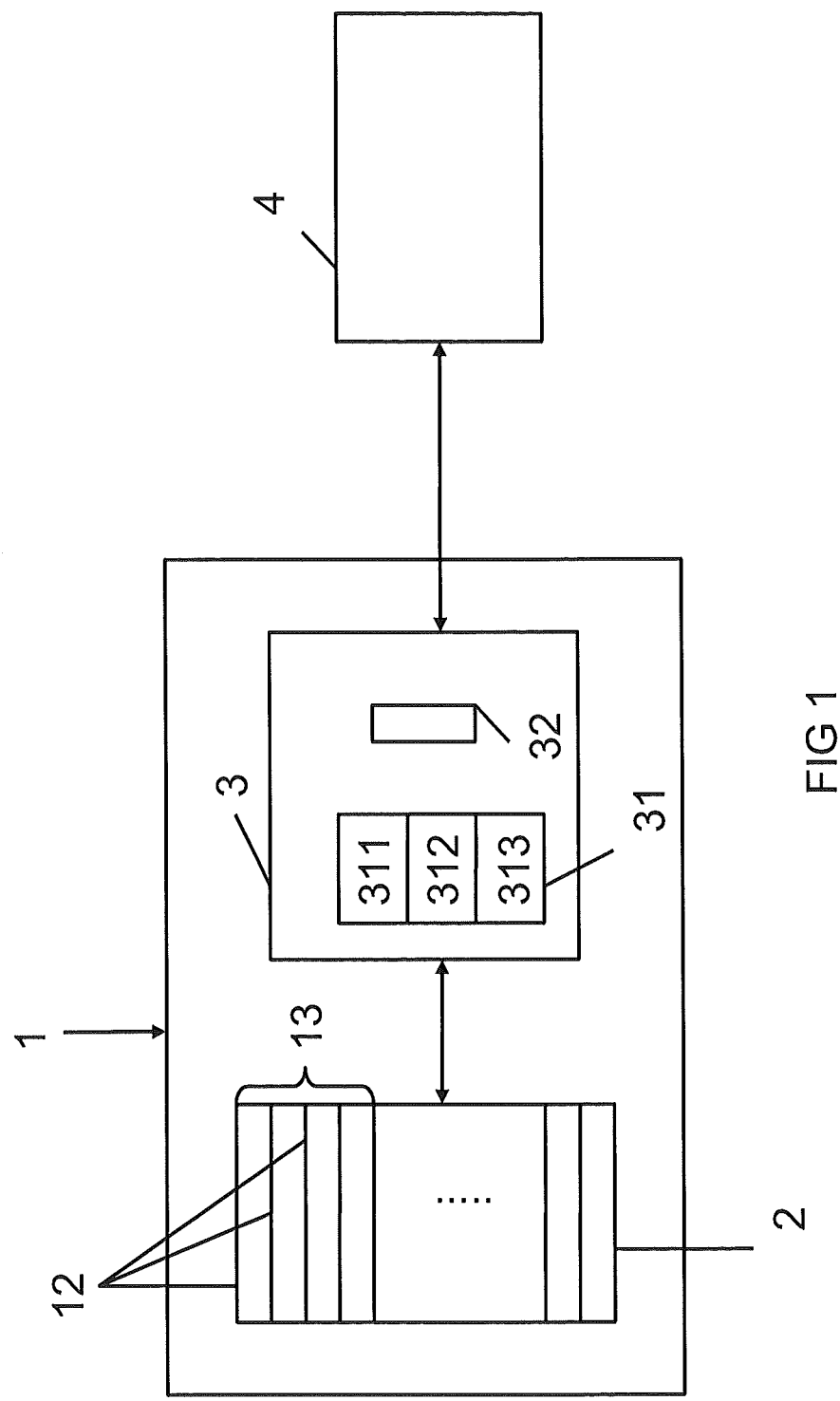
FIG. 1 a block diagram of a storage system according to an embodiment of the present invention, FIG. 2 another representation of the storage system of FIG. 1, FIG. 3 a diagram illustrating a reading process according to an embodiment of the invention, FIG. 4 a flow chart illustrating a reading process according to an embodiment of the present invention, FIG. 5 a diagram illustrating a writing process according to an embodiment of the invention, FIG. 6 a flow chart illustrating a writing process according to an embodiment of the present invention, and FIG. 7 in diagram a), an embodiment of write cache entries, and in diagram b), a data structure according to an embodiment of the present invention for usage in a write cache cleaning routine.

As an introduction to the following description, it is first pointed at a general aspect of the invention, concerning a storage controller for controlling reading and writing of data from/to a solid state memory device. There is provided a read cache for buffering address mapping information representing a subset of address mapping information stored in the memory device. The address mapping information includes a mapping of logical address information for identifying data in a requesting host to physical address information for identifying data in the memory device. In addition to the read cache, a dedicated write cache is provided for buffering address mapping information to be written to the memory device. In other words, the present concept is applicable even to solid state memory devices with huge capacity for the reason that the complete address mapping information will be stored in the solid state memory device itself. Only portions of it—which portions are collectively denoted as a subset of the address mapping information—is buffered in a read cache in the controller. The read cache may temporarily buffer address mapping information that for example is identified as being used more often than other address mapping information such that a read request issued by a host may be served more quickly for the reason that when the address mapping looked for can be found in the read cache it can be taken from there.

Note that in preferred embodiments a subset of data stored in the memory device may be buffered in a separate data cache for providing quick access to such data. There may be embodiments in which such data cache—be it for the support of reads and/or writes of data—may be implemented in the same physical cache memory as the read and write cache for buffering address mapping information, however, the address mapping read cache may then be logically separated from the data cache in that content buffered in the address mapping read cache is searchable independent from content buffered in the data cache and vice versa. The read cache in a first instance only holds address mapping information for serving read requests. In such scenario, the read cache preferably does not contain address mapping information that has previously changed or has been added and still needs to be written to the memory device for permanent storage. Such address mapping is buffered in a different cache, i.e. the write cache. The write cache in a first instance only holds address mapping information that still needs to be written to the memory device for permanent storage. In this context it is preferred that the write cache is logically separated from the read cache in that the write cache preferably does not contain a subset of the address mapping information of the memory device that only serves for accelerating read requests. There may be embodiments, in which there additionally is provided a separate data cache for temporarily buffering data that still need to be written to the memory device for permanent storage. Such data cache may be implemented in the same physical cache memory, however, the address mapping write cache may then be logically separated from the data cache in that the content buffered in the address mapping write cache is searchable independent from content buffered in the data cache and vice versa. Both read and write cache can be maintained, for example, in a least-recently-used (LRU) or other caching replacement strategies and independent from each other. Note that between each of the read and write steps, dedicated cache maintenance operations (counters) can be executed. As these depend on the caching strategy used, they are not further mentioned here.

The write and read cache may be implemented in a dedicated main memory area in the controller. These caches may be organized as tables or hash maps or in another form of data structure. The read cache entries advantageously are organized in meta-data entries each entry of which contains a logical address and a physical address associated with the logical address which entries might be contiguous or might not be contiguous. The write cache entries may be individual logical to physical address mappings, which preferably are organized into blocks to which they belong to. In a preferred embodiment, the write cache may also be physically separated from the read cache in that both caches make use of different memory technologies they are based on. In an embodiment, the write cache may be implemented in a non-volatile memory while the read cache may be implemented in a volatile memory. In this context, a preferred volatile memory is SRAM or DRAM, a preferred non-volatile memory is Phase Change Memories (PCM) or MRAM. In another embodiment, the write cache may also be implemented in a volatile memory, however, such memory or at least the part of the memory the write cache is implemented in may be a fail-safe memory which is understood as a memory to which fail-safe elements are added which prevent that address mappings stored in the write cache are lost in response to a power down of the controller. Such elements may comprise power back-up systems, such as a battery backed SDRAM, or emergency routines for emergency storing the address mappings from the volatile write cache into a non-volatile memory prior to a power down. In another embodiment, the entire main memory may be embodied according the needs of the write cache, such as a battery backed SDRAM, PCM or MRAM.

The solid state memory device preferably is a non-volatile, electrically rewritable memory device such as a NAND-flash-based memory device. However, other solid state memory devices such as PCM can be used. It is understood that the term "device" is not restricted to a single memory chip. In contrast, it is a preferred that the term device may include multiple memory chips building a memory device in combination. In the following, it is referred to a flash memory device as a preferred embodiment although it is appreciated that all the features introduced in combination with the flash memory device shall be disclosed in connection with other memory devices realized in other solid state technologies, too.

In its proper operating environment, a storage system comprising a storage controller and a flash memory device is coupled to a host digital system—or briefly a host—such as a host computer system, a block device or a file system or otherwise. The flash memory device provides a nonvolatile mass storage for use by the host. Data to be stored in or to be read from the flash memory device is addressed by the host with one of a plurality of logical address information, such as a logical block address (LBA). The storage system transforms the logical address information into one of a plurality of physical address information by which the data stored in the flash memory device can be accessed. As such, a mapping, e.g. in form of a table, between the logical addresses as used at the host and the physical addresses as used in the memory device is required, which address mapping information preferably is stored in the flash memory device itself. The address mapping information may be scattered over the entire flash memory device and as such may represent a scattered address mapping table. For fault tolerance, it is preferred that multiple copies of the complete address mapping information may be stored in different locations of the flash memory device. It is preferred that the whole address mapping information is stored in the flash memory device while a read and write cache is maintained in the main memory of the controller for performance reasons. By such approach, storage systems with a large-capacity, high performance flash memory device can be realized in which systems the large address mapping table is stored in the flash memory device itself and a cache of the main memory in the controller may be provided for temporarily storing and fast accessing logical-to-physical address mapping information.

An entry in the address mapping table stored in the flash memory device assigns physical address information to logical address information. Specifically, in flash technology a memory chip, e.g. a typical NAND Flash memory chip,—be it a chip with single level cells (SLC) for binary information coding, or with multi level cells (MLC) for multi level information coding—comprises multiple blocks, a block consisting of e.g. 64 pages with each page encompassing 4 KB of memory space. This adds up to a block size of 256 KB. Usually, flash pages can be addressed by using addresses encoded into a 32-bit word limiting the maximum capacity of an entire flash memory device to $2^{32}*4$ KB=16 TB in one embodiment. The address mapping table may hold one address entry for each page, an address entry typically comprising the physical (page) address and the logical (page) address. Thus, a block of the flash device in which address information is exclusively stored—also referred to as address mapping block—can hold a maximum of 65536 address mapping entries, for example.

In order to equalize the wear of such address mapping block these blocks are also written out of place and the whole address mapping table is therefore not contiguously stored in the flash memory device but rather split into single block-sized sub-tables spread across the flash memory device. However, it is preferred that a block containing address mapping information does not hold user data in addition to the address mapping information. For the reason that address mapping blocks may be scattered over the entire flash memory device, it is preferred to maintain a data structure containing the physical addresses such address mapping blocks can be found at. Such data structure may also be organized as a table, also referred to as block mapping table which maps a range of page addresses to a block address of an address mapping block. This block mapping table is significantly smaller in size than the complete address mapping table spread across the flash memory device. E.g., for a flash memory device with a total capacity of 2 TB the complete address mapping table consumes 2 GB of 4 Byte mapping entries, 1 k mapping entries can be stored in one page, and 64 k mapping entries can be stored in one block, hence 8 k blocks are needed to store the address mapping table. Assuming that each of those 8 k blocks can be addressed by 4 Bytes, the block mapping table may claim 32 kB which corresponds to 8 pages only. Similarly, in another embodiment each page with mapping entries could be addressed individually instead of a full block, hence 512 k Pages are then addressed by 4 Bytes using 2 MB for the block mapping table. In an advantageous solution, the block mapping table is built at the very beginning from individual global mapping blocks residing in the flash memory device and is buffered in the main memory for fast access.

The controller referred to above is designed for controlling operations performed by the flash memory device. The controller manages data in the flash memory in general and controls internal management operations. In one embodiment, the controller is separate from the flash memory device. In an alternate embodiment, the controller is an integral part of the flash memory device itself. In yet another embodiment, the controller can be physically split into one or more sub-controllers each controlling a part of the flash memory device and/or performing only certain flash management tasks. In another preferred embodiment, the term "controller" as used herein refers to an application specific integrated circuit (ASIC) or field programmable gate arrays (FPGA), an electronic circuit, one or more processors (shared, dedicated, or group) and memory that performs one or more software or firmware programs/algorithms, a combinatorial logic circuit, and/or other suitable components that provide the described functionality.

FIG. 1 illustrates the basic elements of a storage system 1 according to one exemplary embodiment of the present invention. The storage system 1 generally includes a flash memory device 2 in signal communication with a controller 3. A host 4 is connected to the storage system 1, and in particular to the controller 3 of the storage system 1. The host 4 specifically may be any entity requesting reading data from the storage system 1 and writing data to the storage system 1.

The controller 3 controls the necessary functionalities (e.g., wear-leveling, logical to physical address translation using address mapping tables, maintaining these mappings tables, garbage collection, etc.) of the flash memory device 2. The controller 3 comprises a main memory 31 including a read cache 311, a write cache 312, and a main memory section 313 for other tasks, and a processor 32 along with other components not further shown.

The flash memory device 2 includes a number of pages 12 grouped together into blocks 13 (e.g. 64 pages per block). Blocks 13 of the flash memory device 2 may physically be on different flash memory chips and the flash memory chips may be grouped into channels through which the flash memory chips are controlled by the controller 3. Therefore, the flash memory device 2 can be seen as a contiguous virtual memory space over all flash memory chips present in the flash memory device 2. The number of blocks 13 and pages 12 per block 13 as well as the number of chips and channels can vary depending on the application and should not be limited to the configurations shown herein.

The flash memory device 2 includes meta-data structures which comprises of one or a number of key information, such as, for example, address mapping tables, a bad block list, error correction codes, etc. These meta-data structures are saved in the flash memory device 2 along with normal data and are reconstructed at boot-time.

Figure 2:
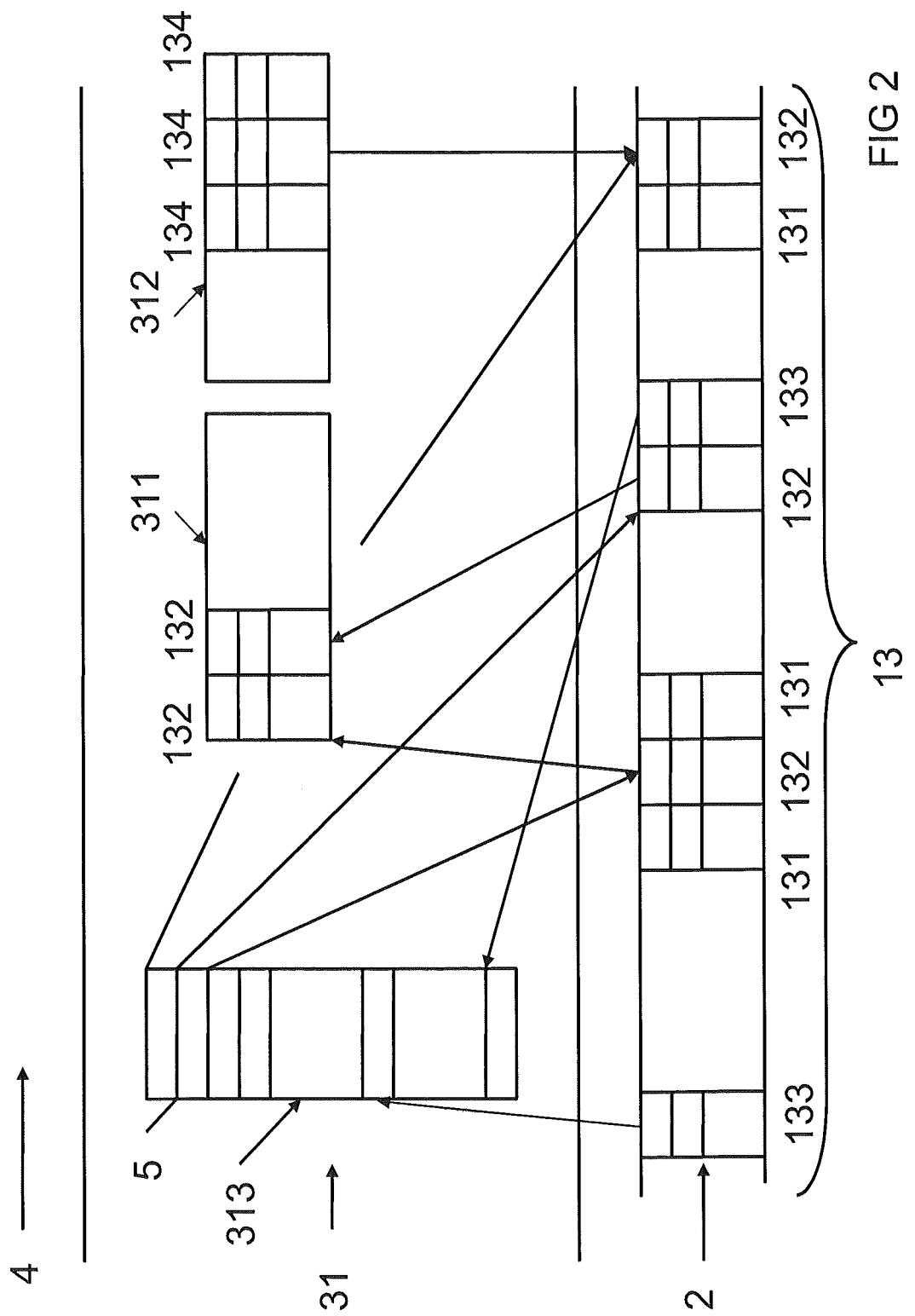

In FIG. 2 another representation of the embodiment of a storage system 1 according to FIG. 1 is illustrated. FIG. 2 represents a view on the different memories involved and indicates actions by means of arrows between the various memory elements.

In a section below the dotted line, the flash memory device 2 is represented by multiple blocks 13 shown in form of pillars next to each other. Each block 13 again contains multiple pages indicated as horizontal stripes. The blocks 13 are marked according to their content: Reference 131 denotes blocks containing user data, or data in general. Reference 132 denotes blocks which contain address mapping information, and in particular continuous LBA-to-PBA mapping information. Typically, an address mapping block 132 comprises pages exclusively holding LBA-to-PBA mapping information. Preferably, such address mapping blocks 132 do not contain user data. And reference 133 denotes global mapping blocks which blocks 133 may exclusively contain information which blocks of the flash memory device 2 are embodied as address mapping blocks 132. The global mapping blocks 133 in combination hence store the complete information where address mapping blocks can be found in the flash memory device. A combination of all global mapping blocks 133 is also referred to as block mapping table 5. Preferably, the address offset of an address mapping block 132 is given implicitly by the position in the block mapping table 5. Consequently, a global mapping block 133 maps a range of page addresses to a physical block address holding the address mapping information for that said range and hence indicates at which physical address in the flash memory device the address mapping block 132 starts. Overall, the LBA to PBA mapping information may be organized together with data as a log-structured array in the flash memory device 2, and hence is written out of place as well.

In a section above the dotted line a representation of the main memory 31 includes a read cache 311, a write cache 312, and a main memory section 313. The read cache 311 comprises address mapping information in form of address mapping entries for supporting read requests. Schematically, two blocks 132 of address mapping information are illustrated in the diagram. The write cache 312 comprises address information to be written to the flash memory device 2. Schematically, three blocks 134 of address mapping information to be written are illustrated in the diagram. The main memory section 313 holds a data structure which is called block mapping table 5. The block mapping table 5 comprises information about where in the flash memory device 2 address mapping blocks 132 can be found. Upon booting global mapping blocks 133 are fetched from the memory device 2 and will be copied in the main memory 31 for supporting the look-up of address mapping information. Arrows from global mapping blocks 133 in the flash memory device 2 to the block mapping table 5 shall illustrate the building of the block mapping table 5 by these individual global mapping blocks 133 stored in the flash memory device 2. Arrows between the block mapping table 5 and address mapping blocks 132 in the flash memory device 2 shall indicate that the (block and page) content of the block mapping table 5 points to locations in the flash memory device where address mappings blocks 132 reside. Insofar, the entries in the block mapping table 5 represent pointers to the address mapping blocks 132 on the flash memory device 2. In another embodiment those entries could represent pointers to pages holding address mapping information.

The arrows between flash memory device 2 and the read cache 311 indicates that address mapping information taken from address mapping blocks 132 in the flash memory device 2 are transferred to the read cache 311 once such information is believed to be of use in the read cache 311. Typically, frequently accessed data associated with such address mappings may be selected for a transfer into the read cache 311. There are many algorithms known for selecting the most suitable entries to be passed from the memory device 2 to read cache 311 and how those entries are removed from the read cache 311, all based on different strategies. As an example, an LRU (Least Recently Used) algorithm may be implemented for maintaining address mapping entries in the read cache 311. Note that there is no need to transfer an address mapping block 132 in its entirety to the read cache 311; instead a page transfer may be envisaged for the reason that a reading operation on flash encompasses a page at finest granularity. However, according to a preferred embodiment, complete address mapping blocks 132 may be transferred from the flash memory device 2 into the read cache 311. Arrows between the read cache 311 and the flash memory device 2 indicate that LBA/PBA mapping entries in the read cache 311 point to data blocks 131 in the flash memory device 2, such that the data can immediately be fetched from the corresponding physical address in flash memory device 2 once the corresponding mapping entry is found in the read cache 311.

Entries in the read cache 311 may become outdated. A suitable replacement mechanism may be run from time to time. In case the read cache 311 is full and a new address mapping entry deserves to be transferred into the read cache 311, again, a suitable algorithm may be applied for determining which current entry may be removed from the read cache 311 instead. It is noted that preferably there systematically are no entries in the read cache 311 to be written to the flash memory device 2.

All entries still to be written to the flash memory device 2 reside in the write cache 312. The arrow between the write cache 312 and the flash memory device 2 indicates that at a certain point in time entries in the write cache 312 may be written to the flash memory device 2. For the reason that the entries in the write cache 312 are address mapping entries those entries will be written to address mapping blocks 312 reserved for address mapping information only. For the reason that the smallest granularity in writing to flash also is a page, at minimum one page is written from the write cache 312 to an address mapping block 312 of the memory device 2, preferably as a write out of place. However, according to another embodiment of the invention, the write cache 312 may also hold individual address mapping entries organized into blocks to which they belong to. This supports the writing of a complete block to a free block in the flash memory device 2.

Figure 3:
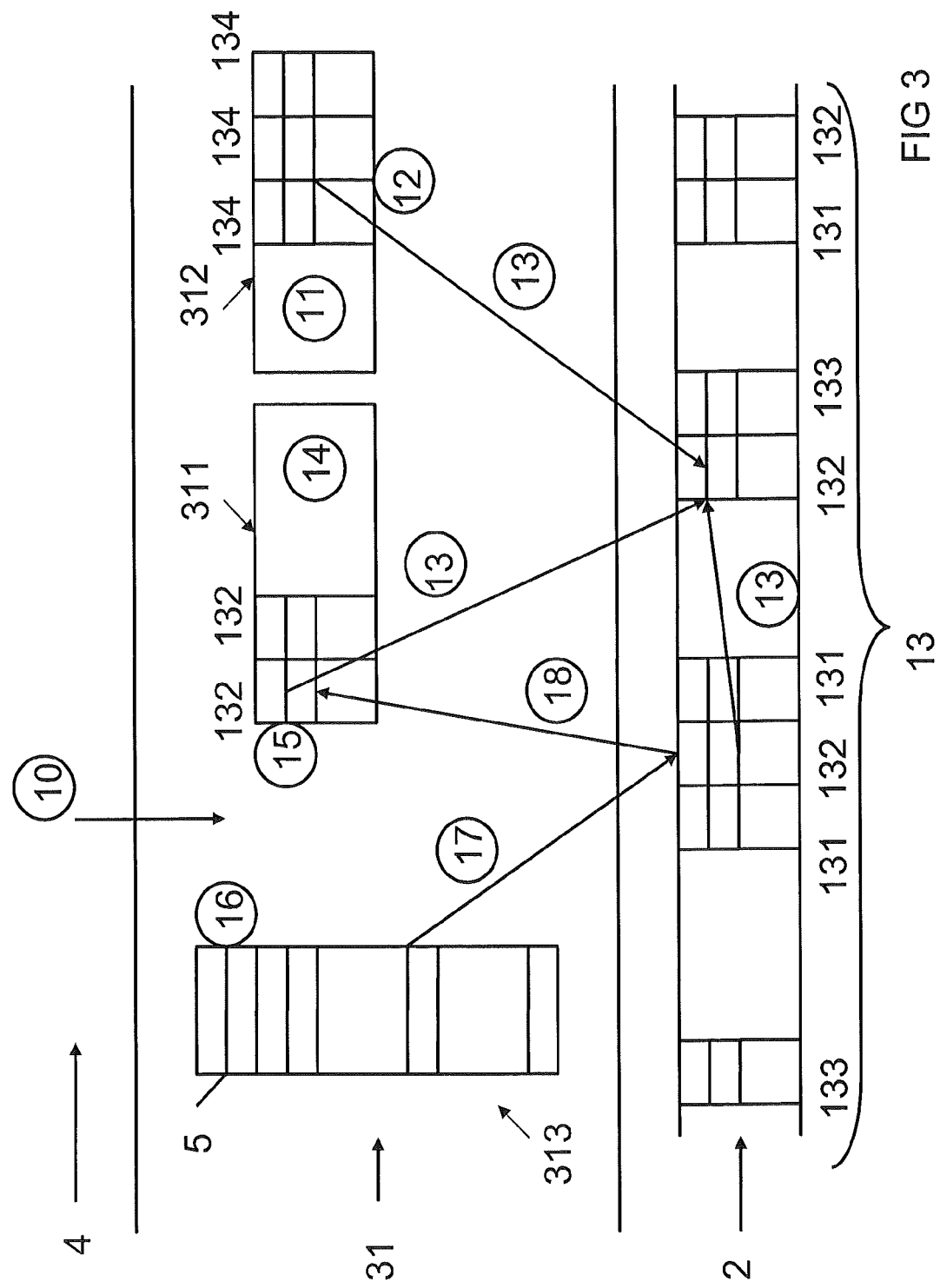

FIG. 3 illustrates a reading process according to an embodiment of the invention based on an illustration similar to the one used in FIG. 2. Process steps are now included and denoted by reference signs.

A host 4 issues a request 10 to the storage system 1 for reading specific data from the flash memory device 2. For identifying the data at the host, the host provides logical address information along with the data. In response to a receipt of the logical address information the controller of the storage system searches the write cache 312 for an entry containing such logical address information, step 11. If such logical address information is found in the write cache 312, step 12 the corresponding entry contains a physical address associated with the logical address which physical address specifies where in the flash memory device 2 the requested data is located. The controller may then issue a data read operation, step 13, for fetching the data from this physical address and serve the host with the data. The data read operation may comprise a couple of individual steps subject to the operating system of the storage system and the interface to the host. However, if no entry with the logical address information requested is found in the write cache, i.e. if the logical address is not found and consequently an associated physical address cannot be identified, the read cache 311 is searched for an entry containing such logical address information, step 14. If such logical address information is found to reside in the read cache 311, step 15, such entry contains the associated physical address which specifies where in the flash memory device 2 the requested data is located. The controller may then issue a data read operation, step 13, for fetching the data from this physical address and serve the host with the data. However, if no entry with the logical address information requested is found in the read cache 311, i.e. if the logical address information is not found and consequently an associated physical address information can not be identified, the controller initiates searching the block mapping table 5 in the main memory, step 16, for fetching the corresponding address mapping block 132 from the flash memory device 2 and identify the physical address information from there, step 17. As a result, a data read operation, step 13, will be issued by the controller for fetching the data associated with the physical address identified. In this scenario, it may be preferred to update the read cache 311 accordingly, step 18, for the reason that the read cache 311 did not provide a mapping entry associated with the data just requested by the host. Subject to the algorithm applied for maintaining the read cache 311, the controller may initiate a procedure in which the address mapping entry—or corresponding page or block—associated with the data may simply be added to the read cache 311 provided the read cache 311 is not full yet. Or, in case the read cache 311 is full yet, an entry—or corresponding page or block—is identified for being removed from the read cache 311 and is replaced by the above address mapping entry.

Figure 4:
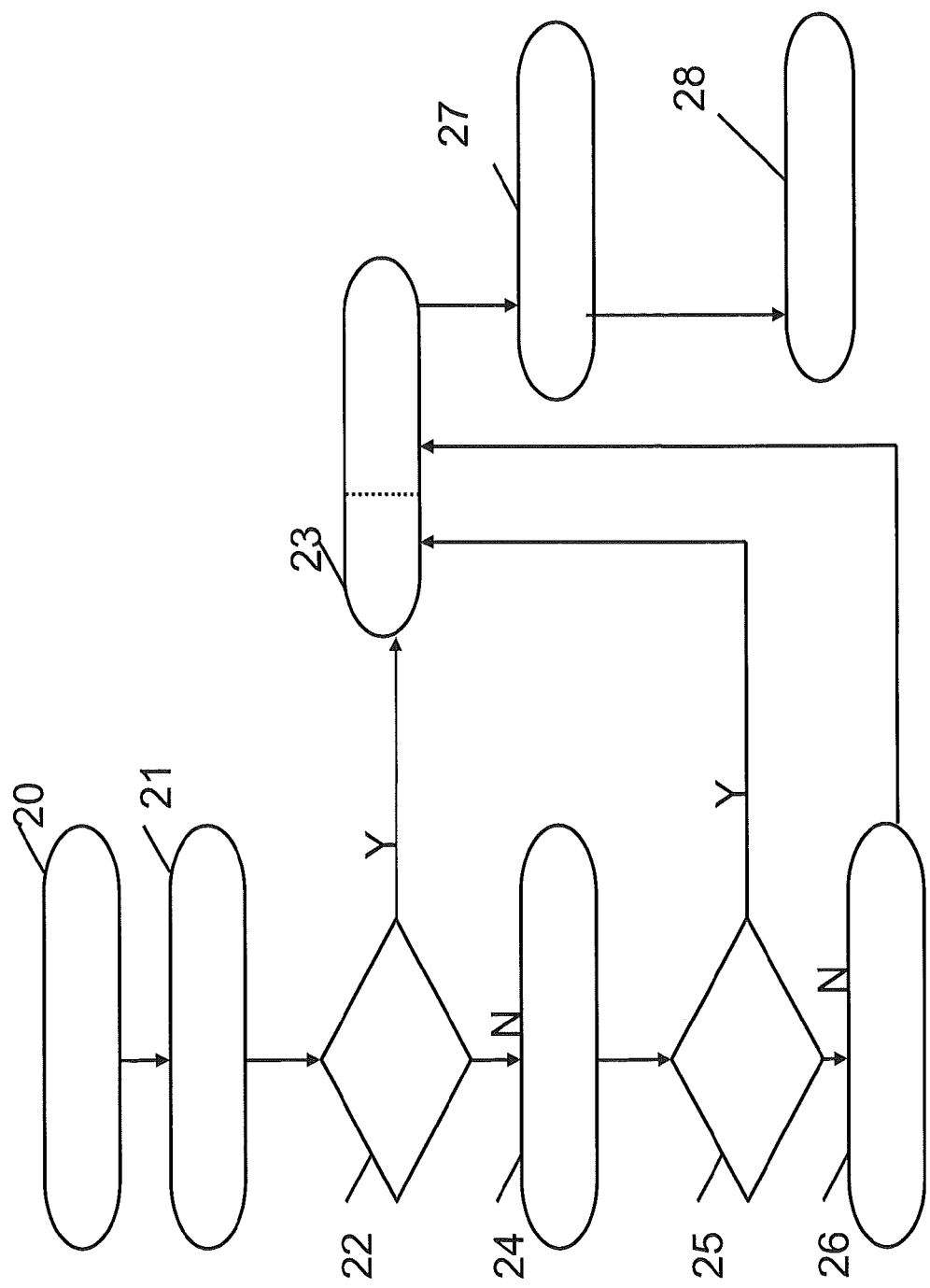

In the flow diagram of FIG. 4, a method for reading data from a solid state memory device is illustrated. In step 20 a controller of a storage system according to an embodiment of the present invention receives a read request 20 from an upper layer. The request includes logical address information for identifying the data to be read. In step 21 the controller searches in a write cache 312 for the logical address information which write cache 312 is designed for buffering mapping information to be written to a flash memory device of the storage system. It is determined if the logical address information is found in the write cache, step 22. If it is found, it means that the physical address information indicating where the data resides in the flash memory device is identified, as this physical address information is mapped to the logical address information in the corresponding entry in the write cache. In such case (Y) the controller issues a data read operation in step 23. If the logical address information is not found in the write cache (N), then the read cache is searched for the logical address information supplied by the upper layer, step 24. It is determined if the logical address information is found in the read cache, step 25. If the searched information is found in the read cache (Y) the controller issues a data read operation in step 23 since all the information to fetch the data is present. Preferably the data read operation includes the physical address information as parameter and the return of this operation is the data. However, if the searched information is not found in the read cache (N), the controller identifies the physical address information associated with the logical address information by means of the mapping information stored in the memory device, step 26. Such identification is preferably accomplished by means of the block mapping table 5 as referred to in connection with the embodiment of FIG. 3. Finally, the controller issues a data read operation with respect to the physical address information identified, step 23. Optionally, a procedure for updating the read cache may follow, step 27. According to another embodiment of the invention, and as depicted as step 28 in FIG. 4 the ratio between the main memory portion devoted to the read cache and the write cache may be dynamically adapted to the current read and/or write workload in order to optimize the overall performance of the controller. Such ratio may be determined after each read process, and the cache sizes may be adapted accordingly.

Searching the write cache first or the read cache may depend on how the write cache is maintained: In case updates to entries in the write cache are updated in the read cache in a delayed manner, it may be beneficial to first search the write cache in a read operation for the reason that in such embodiment the write cache may be the only location holding the currently valid address mapping information. However, in case updates to entries in the write cache are immediately followed by a corresponding update in the read cache, then in a read operation the read cache may be searched first followed by a search in the write cache in case the searched address mapping information cannot be found in the read cache. Generally, it may be preferred to search the write cache first for the reason that it holds the most recent address mapping information.

In case the storage controller includes a data cache, then, in a preferred embodiment, prior to searching an address mapping in the write cache or in the read cache, the data cache may be searched for the data itself.

In another preferred embodiment of the reading method, the locality of workloads is taken into account. The locality of workload assumes that address mapping entries accessed in a timely fashion can be retrieved within a spatial locality with a certain likelihood. Namely, in this embodiment it is investigated if a mapping entry is missing in both the read cache and the write cache. This information is automatically gathered when the reading routine is executed and the searched logical address information is found neither in the read cache nor in the write cache. As a result, the read cache not only is updated with the page or block the missing address information resides in the flash memory device but also with the neighboring address mapping pages or blocks which are loaded into the read cache for better serving future read requests. This is because, the neighboring LBA-to-PBA mappings are also assumed to be used in the near future due to the spatial locality of workloads.

Figure 5:
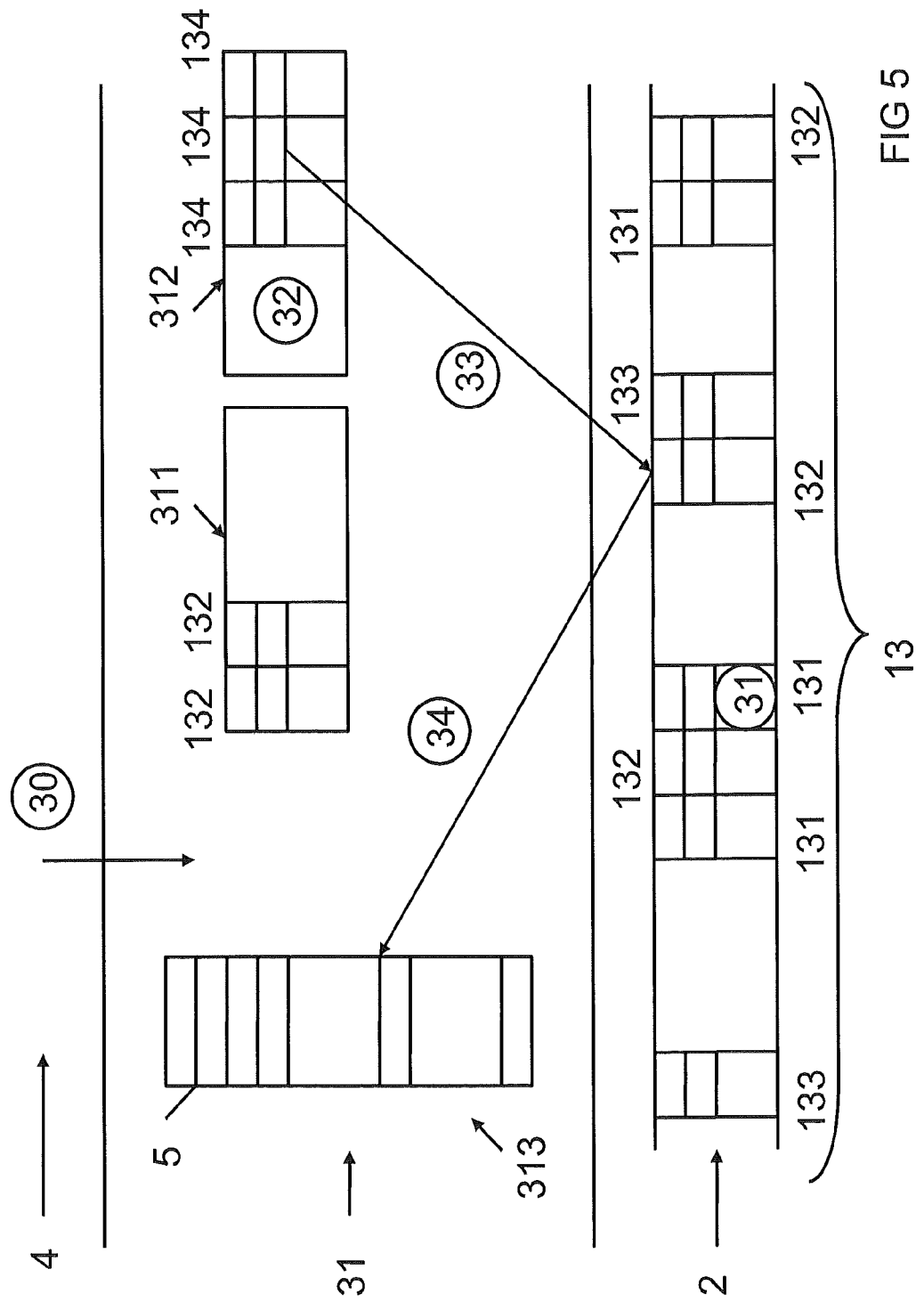

FIG. 5 illustrates a writing process according to an embodiment of the invention based on an illustration similar to the one used in FIG. 2. However, process steps are now included and denoted by reference signs.

A host 4 issues a request 30 to the storage system for writing data to the flash memory device 2. The data and logical address information typically are supplied by the host together with the request. The logical address information is the logical address under which the host has filed such data. In response to a receipt of such request the controller writes the data to the next free page in the flash memory device 2, step 31, or alternatively to a data cache for caching user data. When the data is written to the flash memory device it is typically written to a page according to the current write position returned by a free page allocator. The free page allocator preferably serves pages from a free block queue. In any case, the location where the data now is written to within the storage system is denoted by some physical address information.

The controller searches the write cache 312 for an entry containing the logical address information, step 32. If such logical address information is identified to reside in the write cache 312, the associated physical address information in such entry will be updated with the physical address information identifying the location where the data newly resides. If such logical address information is not identified to reside in the write cache 312, a new entry may be inserted to the write cache 312 with the logical and the new physical address information.

At some point in time, preferably as a background task, the entire write cache, or at least portions of it is written to the flash memory device according to a strategy followed by a write cache cleaning process which is preferably different from a read cache maintenance algorithm, step 33. For the reason that such writing of address mapping information may follow the write out of place procedure there may be new address mapping blocks allocated or existing address mapping blocks erased and assigned to the free block allocator such that preferably in step 34 the block mapping table 5 is updated. Such updating activity initiated by the controller may also be executed as a background task at some point in time.

Figure 6:
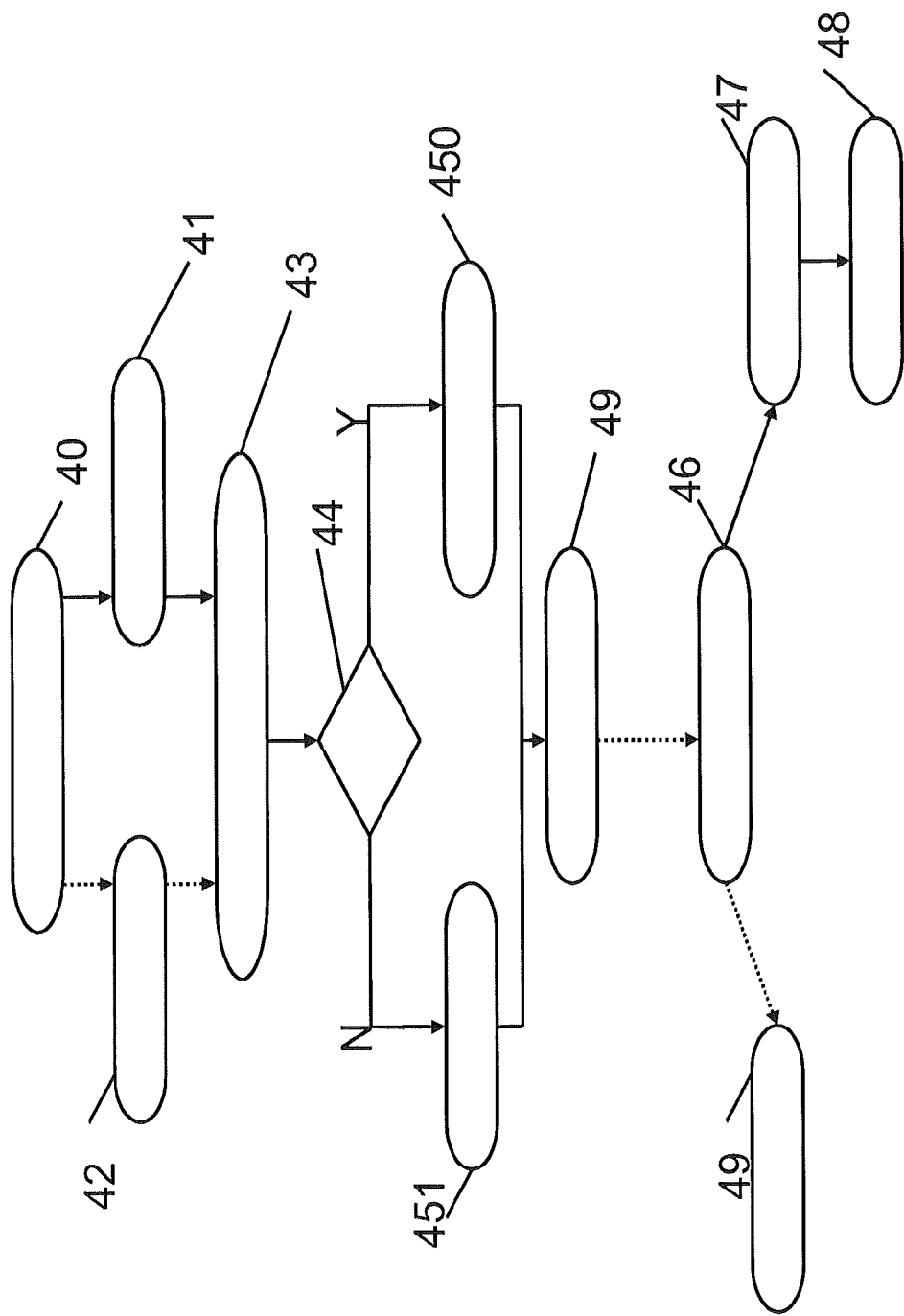

In the flow diagram of FIG. 6, a method for writing data to a solid state memory device is illustrated. In step 40 a controller of a storage system according to an embodiment of the present invention receives a write request from an upper layer. The request includes logical address information associated with data to be written. In step 41 the data is stored either in a free page of the flash memory device or, alternatively, or in addition, in a main memory portion dedicated as data cache, step 42. The controller searches in a write cache for the logical address information supplied by the host, step 43, which write cache is designed for buffering mapping information to be written to the flash memory device of the storage system. It is determined if the logical address information is found in the write cache, step 44. If it is found (Y), it means that such entry in the write cache simply needs to be updated with the new physical address information indicating where the data resides now, step 450. When the searched logical address information is not found in the write cache (N) the controller adds a new address mapping entry for the data in step 451. Following a write strategy of the storage system the write cache is written to the flash memory device at some later point in time, step 46. The granularity of mapping information to be written to the flash memory device later is subject to the strategy followed by the write cache cleaning process. Such write cache cleaning process may be a background task which periodically writes out entries in the write cache to the flash memory device according to a given caching strategy.

In another task, the block address table is updated in response to the above write procedure, step 47. According to another embodiment of the invention, and as depicted as step 48 in FIG. 6, the ratio between the main memory portion devoted to the read cache and the write cache may be dynamically adapted to the current read and/or write workload in order to optimize the overall performance of the controller. Such ratio may be determined after each write cache clean process, and the cache sizes may be adapted accordingly.

Optionally, in step 49, the read cache is searched for the logical address information associated with the data to be written according to the host's write request. Background of this task is that the subject address mapping entry, however, pointing to the outdated physical data, may—irrespective of already residing in the write cache or not—also already be cached in the read cache for supporting the read request. For this reason, it is beneficial if simultaneously with the present write routine, the read cache may be searched for the corresponding logical address information, too, and will be updated if found so. In case such entry is not found in the read cache, subject to the read caching strategy a new entry may be inserted in the read cache for reflecting the increased importance of this piece of data due to the very recent write request. Such update of the read cache may preferably be implemented in connection with updating the write cache which is understood as being implemented at "the same time", or, alternatively, at the time the write cache is cleaned, step 49 dotted line. This not necessarily needs to have disadvantages since for serving intermediate read requests for this piece of data the write cache is searched first such that the corresponding entry in the write cache will already point to the new location the data now resides. It allows however to destage data from the write cache without having to check if the destaged mapping entries reside in the read cache.

If the storage controller provides for a data cache and upon receipt of a write request the write cache may first be searched for an entry indicating that such data may already reside in the data cache. If the write cache provides for such entry, the new data is written first to the data cache replacing the now outdated corresponding data and the corresponding entry in the write cache may be updated accordingly. Such procedure may advantageously be executed prior to the writing of the new data from the data cache to the flash memory device. However, once the data cache needs to be cleaned according to whichever strategy applied the present write routine is applied in that the data to be written from the data cache to the flash memory device and the associated logical address are received by the address mapping engine, the data is stored in the flash memory device at a physical address, and the corresponding entry in the write cache is searched and updated.

In the following embodiment, a means for supporting a write cache cleaning process is introduced which helps in accelerating such cleaning process. Preferably, an address mapping entry 8 in the write cache 312—as shown exemplary in FIG. 7a—not only includes physical address information 81 mapped to logical address information 82 but also includes a pointer 83 for pointing to another address mapping entry in the write cache 312. Such other address mapping entry is identified as being stored in a common page of the memory device 2, i.e. a common address mapping page in the flash memory device. By means of linking address mapping entries which are stored in the same page in the flash memory device 2, such entries may be updated simultaneously during a write cache cleaning process. The pointer may be generalized into a reference for grouping address mapping entries belonging to a common address mapping region. Such address mapping region may be considered as a unit to be updated in an efficient way. In addition, there may advantageously be provided a data structure 9—as shown in FIG. 7b—stored in the write cache 312 including a page identifier 91, a counter 92 for counting the number of entries in the write cache 312 associated with such page identifier 91, and an entry pointer 93 pointing to a write cache entry associated with such page identifier 91. This data structure 9 helps in a write cache cleaning process to identify the pages in the flash memory device 2 which are most heavily affected by mapping entries in the write cache 312 to be written to the flash memory device 2, and which pages may be preferred for being updated first. The entry pointer 93 preferably points to the first address mapping entry in the write cache 312 related to such common page, wherefrom the other entries belonging to the same page in the write cache 312 are linked successively to each other by means of the pointer 83. Consequently, in the write cache cleaning process the controller may first identify the page ID 91 with the highest count in the counter 92 and start the writing of address mapping entries from there, followed by updating the page ID with the second highest count, etc. The entry pointer 93 provides the starting point in the write cache 312 respectively.

Embodiments of the present invention provide a high read and write performance from/to a solid state memory device. The main memory of the controller is not blocked by a complete address mapping table covering the entire memory device. Instead such table is stored in the memory device itself, and only selected portions of address mapping information are buffered in the main memory in a read cache and a write cache. A separation of the read cache from the write cache enables an address mapping entry being evictable from the read cache without the need to update the related flash memory page storing such entry in the flash memory device. By this design, the read cache may advantageously be stored on a DRAM even without power down protection, while the write cache may preferably be implemented in nonvolatile or other fail-safe memory. This leads to a reduction of the overall provisioning of nonvolatile or fail-safe memory and to an improved scalability and performance over known approaches.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:
1. A storage system, comprising:
a solid state memory device for storing user data and for storing address mapping information for mapping logical address information for identifying user data in a host accessing the storage system to physical address information for identifying user data in the solid state memory device; and
a storage controller for controlling a reading and writing of user data from/to a solid state memory device, the storage controller comprising:

a data cache for buffering user data stored in the solid state memory device, the user data being non-address mapping information and being data requested by the host;

a read cache consisting of a subset of the address mapping information stored in the solid state memory device; and a write cache consisting of address mapping information for user data to be written to the solid state memory device, wherein neither the read cache nor the write cache store user data.

2. The storage system of claim 1, wherein the write cache is maintained as a unit separate from the read cache in that content buffered in the read cache is searchable independent from content buffered in the write cache and vice versa.

3. The storage system of claim 1, wherein the storage controller comprises one of a non-volatile memory and a volatile fail-safe memory including the write cache, and a volatile memory including the read cache.

4. The storage system of claim 1, wherein the storage controller comprises an allocation engine for allocating cache memory space to the read cache and to the write cache subject to one or more of a write workload and a read workload.

5. The storage system of claim 1, wherein an address mapping entry in the write cache includes physical address information, the logical address information associated with the physical address information, and a reference for grouping address mapping entries belonging to a common address mapping region.

6. The storage system of claim 5, wherein the reference corresponds to a pointer for pointing to another address mapping entry in the write cache which other address mapping entry is identified as being stored in a common page of the solid state memory device.

7. The storage system of claim 6, wherein the write cache is further for storing a data structure including a page identifier, a counter for counting the number of entries in the write cache associated with such page identifier, and an entry pointer pointing to a write cache entry associated with such page identifier.

8. The storage system of claim 1, wherein the storage controller further comprises:

a block mapping table for storing information about locations within the solid state drive at which the address mapping information is stored.

9. A method for reading data from a solid state memory device, in which memory device data and mapping information for mapping physical address information for identifying data in the solid state memory device to logical address information for identifying data in a requesting host are stored, the method comprising:

receiving logical address information associated with the data to be read;

searching the logical address information in one of a write cache consisting of address mapping information to be written to the solid state memory device and a read cache consisting of a subset of the address mapping information stored in the solid state memory device, wherein neither the read cache nor the write cache store user data;

if the logical address information is not found in the cache searched, searching the logical address information in the other cache;

if the logical address information is not found in either of the write cache and the read cache, identifying and reading the physical address information associated with the logical address information by means of the mapping information stored in the solid state memory device; and issuing a data read operation for the physical address information identified.

10. The method of claim 9, where the read physical address information is used to update an entry in the read cache.

11. The method of claim 9, comprising if the logical address information is found in the write cache identifying the physical address information associated with the logical address information from a corresponding entry in the write cache, and issuing a data read operation for the physical address information identified.

12. The method of claim 9, comprising if the logical address information is found in the read cache identifying the physical address information associated with the logical address information from a corresponding entry in the read cache, and issuing a data read operation for the physical address information identified.

13. A method for writing data to a solid state memory device, in which memory device data and mapping information for mapping logical address information identifying data in a request to physical address information for identifying data in the solid state memory device are stored, the method comprising:

receiving the data and logical address information associated with the data identified by physical address information;

searching the logical address information in a write cache consisting of address mapping information to be written to the solid state memory device, wherein neither the read cache nor the write cache store user data;

if the logical address information is not found in the write cache, adding an address mapping entry to the write cache comprising a mapping of the logical address;

searching the logical address information in a read cache consisting of address mapping information representing a subset of the address mapping information stored in the solid state memory device; and if the logical address information is found in the read cache, updating the corresponding address mapping entry in the read cache with the physical address information newly associated with the data.

14. The method of claim 13, comprising if the logical address information is found in the write cache, updating the corresponding address mapping entry in the write cache with the physical address information newly associated with the data.

15. The method of claim 13, comprising searching the logical address information in the read cache at a time the write cache is updated.

16. A computer program product comprising a computer readable medium that is not a transitory signal per se, the computer readable medium having computer readable program code embodied therewith, the computer readable program code comprising computer readable program code configured to perform a method according to claim 9.

17. A computer program product comprising a computer readable medium that is not a transitory signal per se, the computer readable medium having computer readable program code embodied therewith, the computer readable program code comprising computer readable program code configured to perform a method according to claim 13.

18. The storage system of claim 1, wherein the read cache is logically separate from the data cache in that content buffered in the read cache is searchable independent from content buffered in the data cache and vice versa.

19. The storage system of claim 1, wherein the write cache is logically separate from the data cache in that content buffered in the write cache is searchable independent from content buffered in the data cache and vice versa.

* * * * *